(12) United States Patent
Ku et al.

(10) Patent No.: US 10,382,994 B2
(45) Date of Patent: Aug. 13, 2019

(54) METHOD AND DEVICE FOR TERMINAL APPLYING OFFSET TO MEASUREMENT REPORT TRIGGERING CONDITION

(71) Applicant: LG ELECTRONICS INC., Seoul (KR)

(72) Inventors: Gwanmo Ku, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 15/574,118

(22) PCT Filed: May 16, 2016

(86) PCT No.: PCT/KR2016/005146
§ 371 (c)(1),
(2) Date: Nov. 14, 2017

(87) PCT Pub. No.: WO2016/186409
PCT Pub. Date: Nov. 24, 2016

(65) Prior Publication Data
US 2018/0352459 A1    Dec. 6, 2018

Related U.S. Application Data

(60) Provisional application No. 62/161,887, filed on May 15, 2015.

(51) Int. Cl.
*H04W 24/10* (2009.01)
*H04W 88/02* (2009.01)
*H04W 24/08* (2009.01)

(52) U.S. Cl.
CPC ........... *H04W 24/10* (2013.01); *H04W 24/08* (2013.01); *H04W 88/02* (2013.01)

(58) Field of Classification Search
CPC ..... H04W 24/10; H04W 88/02; H04W 24/08; H04W 36/0083; H04W 36/30;
(Continued)

(56) References Cited

U.S. PATENT DOCUMENTS

2009/0180447 A1\* 7/2009 Kim ................. H04W 24/10
370/338
2013/0121187 A1   5/2013 Das et al.
(Continued)

FOREIGN PATENT DOCUMENTS

WO    2010076998    7/2010
WO    2012060613    5/2012
(Continued)

OTHER PUBLICATIONS

Lee et al., "Method of Reporting Measurement in Wireless Communication System and Device for Suppording Said Method", May 22, 2014, WO, English machine language translation of WO 2014/077658. (Year: 2014).\*

(Continued)

*Primary Examiner* — Paul H Masur
*Assistant Examiner* — Michael K Phillips
(74) *Attorney, Agent, or Firm* — Lee, Hong, Degerman, Kang & Waimey

(57) ABSTRACT

Provided are a method for a terminal applying an offset to a measurement report triggering condition in a wireless communication system, and a device supporting same. A terminal may measure the quality of a serving cell, measure the quality of a neighboring cell, compare the measurement type of the serving cell with the measurement type of the neighboring cell, and if the measurement type of the serving cell is different from the measurement type of the neighboring cell, apply an offset to a measurement report triggering condition. The measurement type may be any one of a
(Continued)

broadband RS-SINR measurement or a narrowband RS-SINR measurement.

15 Claims, 13 Drawing Sheets

(58) Field of Classification Search
CPC ............ H04W 72/085; H04W 36/0085; H04B 17/309; H04L 1/0026
See application file for complete search history.

(56) References Cited

U.S. PATENT DOCUMENTS

| | | | |
|---|---|---|---|
| 2014/0335868 A1* | 11/2014 | Kubota | H04W 24/10 455/437 |
| 2015/0029995 A1 | 1/2015 | Krishnamurthy et al. | |
| 2016/0337931 A1* | 11/2016 | Wang | H04W 4/70 |

FOREIGN PATENT DOCUMENTS

| | | | |
|---|---|---|---|
| WO | 2014010892 | 1/2014 | |
| WO | WO-2014077658 A1 * | 5/2014 | ............ H04W 24/10 |

OTHER PUBLICATIONS

PCT International Application No. PCT/KR2016/005146, Written Opinion of the International Searching Authority dated Aug. 24, 2016, 44 pages.

* cited by examiner

METHOD AND DEVICE FOR TERMINAL APPLYING OFFSET TO MEASUREMENT REPORT TRIGGERING CONDITION

CROSS-REFERENCE TO RELATED APPLICATIONS

This application is the National Stage filing under 35 U.S.C. 371 of International Application No. PCT/KR2016/005146, filed on May 16, 2016, which claims the benefit of U.S. Provisional Application No. 62/161,887, filed on May 15, 2015, the contents of which are all hereby incorporated by reference herein in its entirety.

BACKGROUND OF THE INVENTION

Field of the Invention

The present invention relates to a wireless communication system, and more particularly, to a method for applying, by a UE, an offset to a measurement report-triggering condition in a wireless communication system, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Meanwhile, a wireless communication system may need to estimate an uplink channel or downlink channel to transmit/receive data, to achieve system synchronization, and to feed back channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

SUMMARY OF THE INVENTION

When a measurement report-triggering condition is satisfied, a UE may perform measurement reporting to a network. The UE may compare (for example, event A3) a measurement result of a serving cell (that is, the quality of the serving cell) with a measurement result of a neighboring cell (that is, the quality of the neighboring cell) in order to determine the measurement report-triggering condition is satisfied. Reference signal signal-to-interference-and-noise ratio (RS-SINR) measurement has been introduced for maximal user throughput and may include two types of measurements, which are narrowband RS-SINR measurement and wideband RS-SINR measurement. Since the accuracy of measurement may vary depending on whether RS-SINR measurement is narrowband RS-SINR measurement or wideband RS-SINR measurement, different measurement report-triggering conditions may need to be determined depending on the RS-SINR measurement type of the serving cell or the neighboring cell. Thus, the present invention proposes a method for applying, by a UE, an offset to a measurement report-triggering condition depending on the RS-SINR measurement type, and a device supporting the same.

According to one embodiment, there is provided a method for applying, by a UE, an offset to a measurement report-triggering condition in a wireless communication system. The UE may include: measuring a quality of a serving cell; measuring a quality of a neighboring cell; comparing a measurement type of the serving cell with a measurement type of the neighboring cell; and applying an offset to a measurement report-triggering condition when the measurement type of the serving cell is different from the measurement type of the neighboring cell, wherein the measurement type may be either wideband reference signal signal-to-interference-and-noise ratio (RS-SINR) measurement or narrowband RS-SINR measurement.

The measurement report-triggering condition may be a condition that the quality of the neighboring cell is better than the quality of the serving cell.

The measurement type of the serving cell may be the wideband RS-SINR measurement, and the measurement type of the neighboring cell may be the narrowband RS-SINR measurement. The offset may be a narrowband RS-SINR offset of the neighboring cell. The measurement report-triggering condition to which the offset has been applied may be a condition that a value obtained by applying the narrowband RS-SINR offset to the quality of the neighboring cell is better than the quality of the serving cell. The UE may further include performing measurement reporting when the measurement report-triggering condition to which the offset has been applied is satisfied.

The measurement type of the serving cell may be the narrowband RS-SINR measurement, and the measurement type of the neighboring cell may be the wideband RS-SINR measurement. The offset may be a wideband RS-SINR offset of the neighboring cell. The measurement report-triggering condition to which the offset has been applied may be a condition that a value obtained by applying the wideband RS-SINR offset to the quality of the neighboring cell is better than the quality of the serving cell. The UE may further include performing measurement reporting when the measurement report-triggering condition to which the offset has been applied is satisfied.

The UE may further include not applying the offset to the measurement report-triggering condition when the measurement type of the serving cell is the same as the measurement type of the neighboring cell.

According to another embodiment, there is provided a UE applying an offset to a measurement report-triggering condition in a wireless communication system. The UE may include: a memory; a transceiver; and a processor to connect the memory and the transceiver, wherein the processor may be configured to: measure a quality of a serving cell; measure a quality of a neighboring cell; compare a measurement type of the serving cell with a measurement type of the neighboring cell; and apply an offset to a measurement report-triggering condition when the measurement type of the serving cell is different from the measurement type of the neighboring cell, and the measurement type may be either wideband reference signal signal-to-interference-and-noise ratio (RS-SINR) measurement or narrowband RS-SINR measurement.

An offset may be applied to a measurement report-triggering condition according to the accuracy of RS-SINR measurement.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-1-DMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
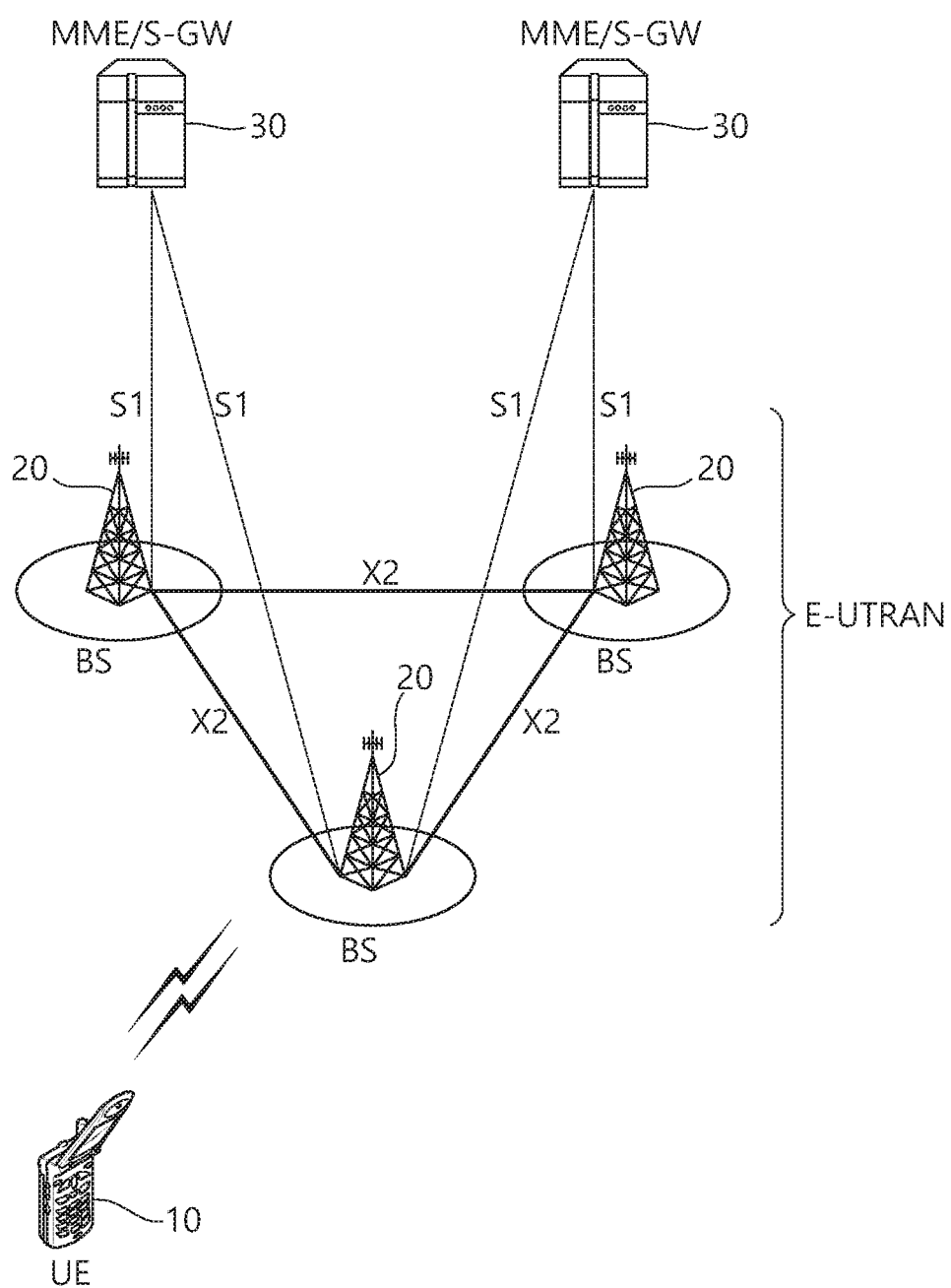
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
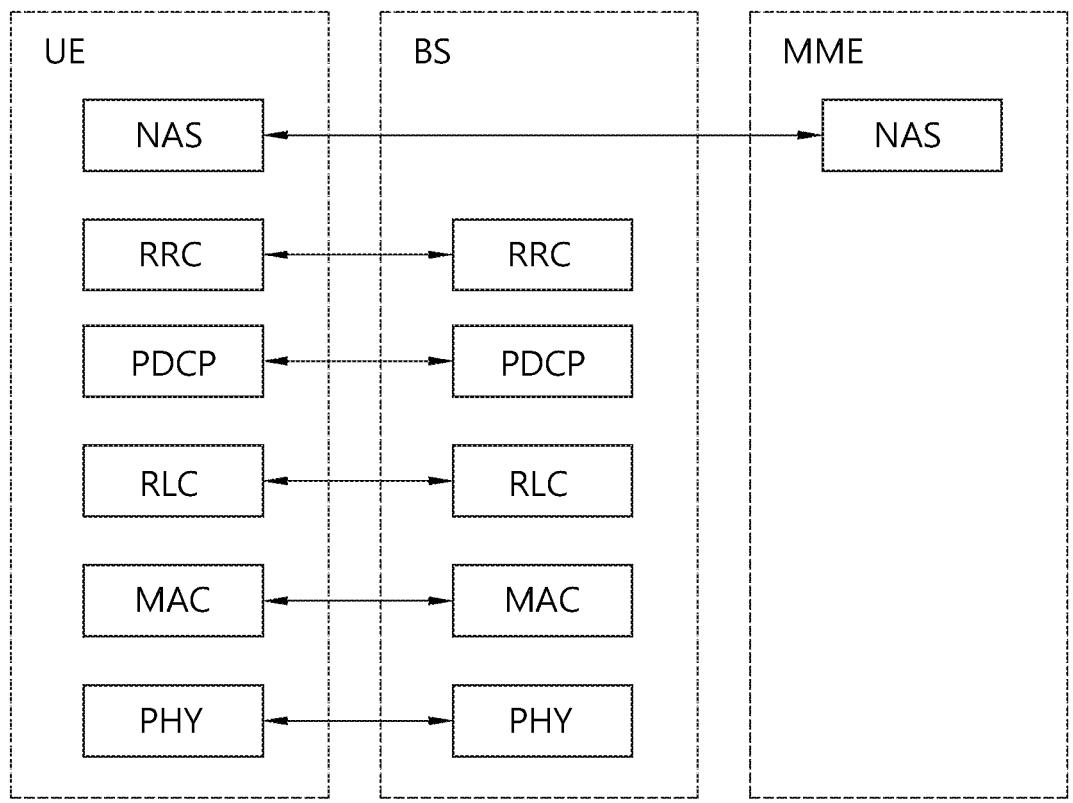
FIG. 2 shows a control plane of a radio interface protocol of an LTE system.
Figure 3:
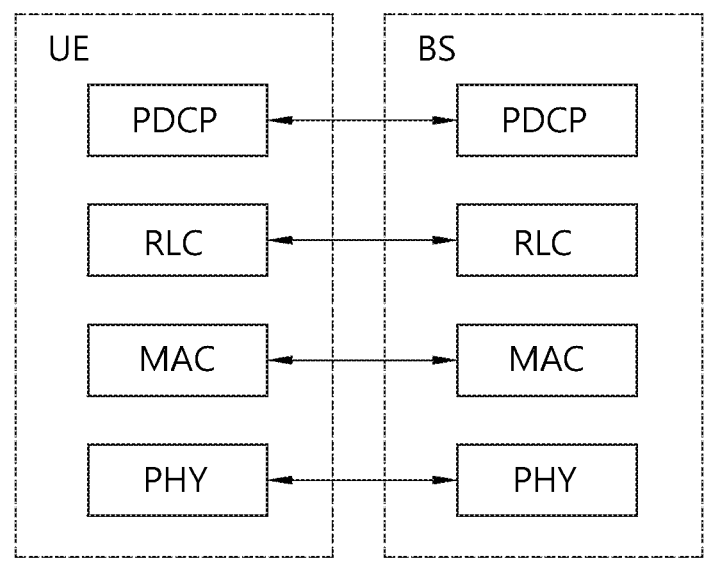
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
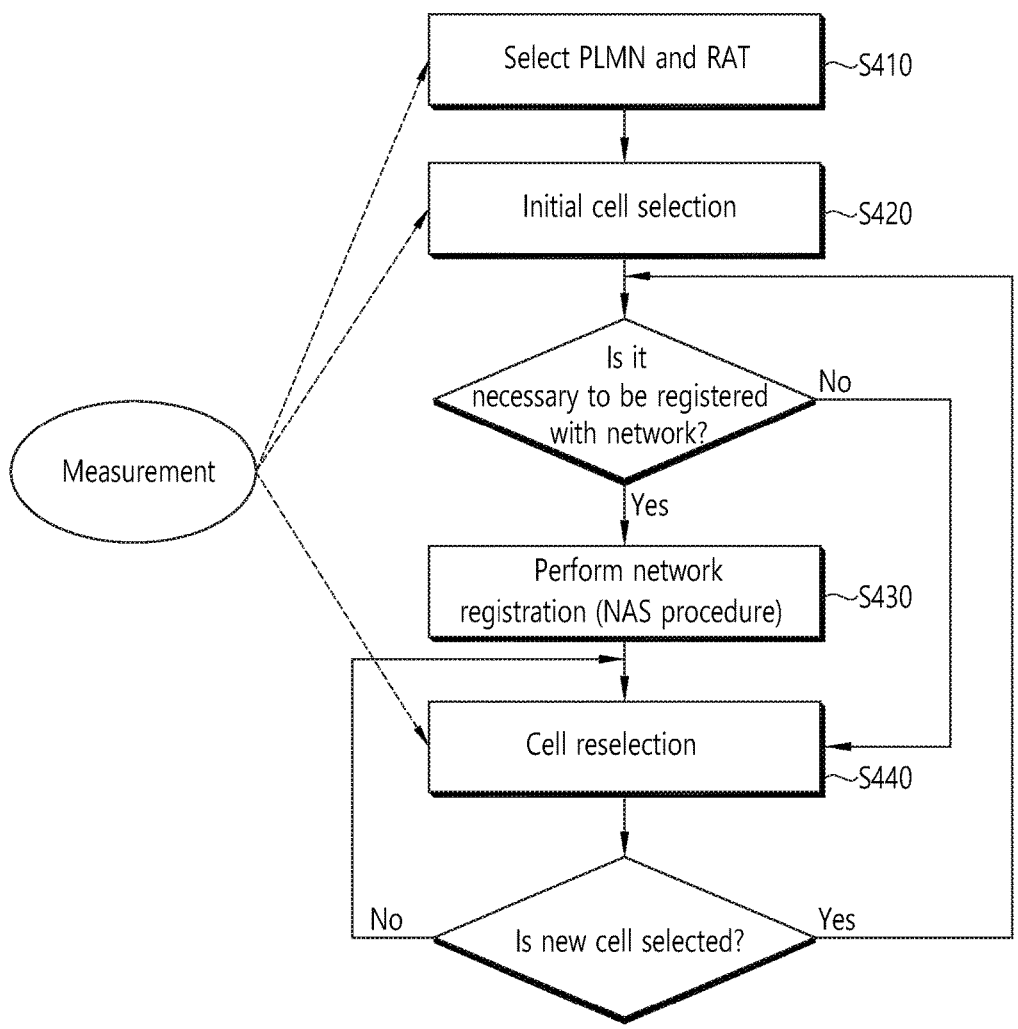
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
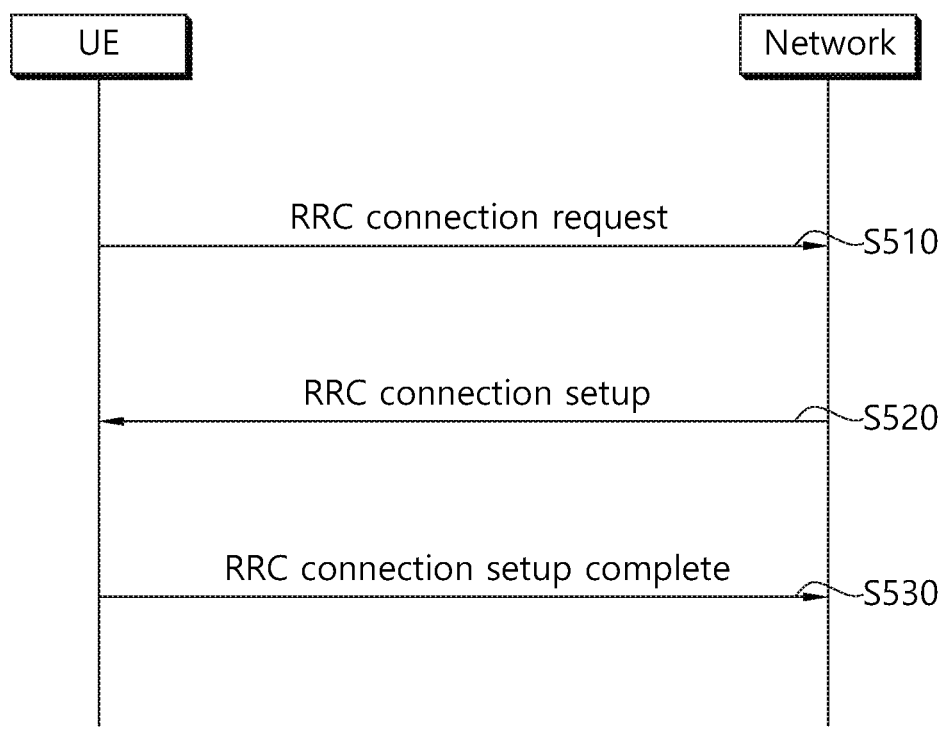
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
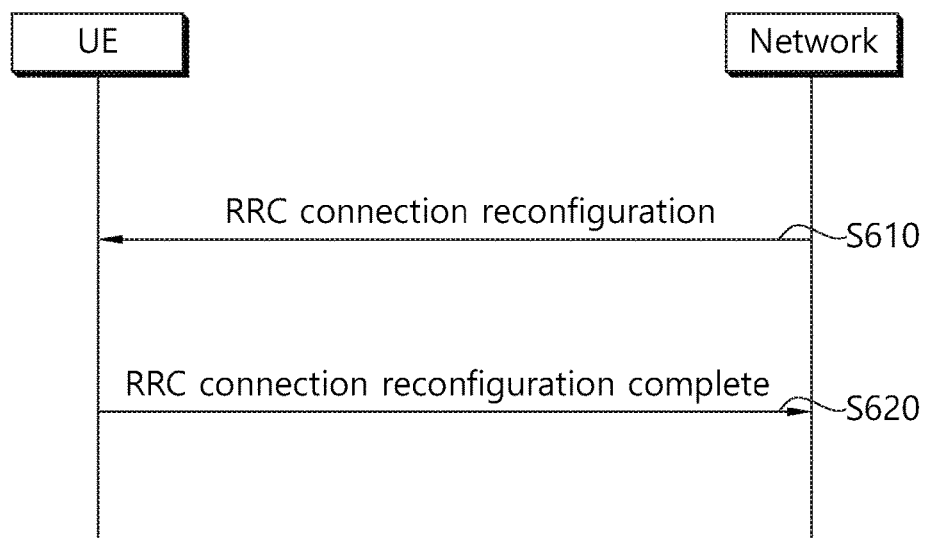
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

Hereinafter, a method and a procedure of selecting a cell by a terminal in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighboring cells for cell reselection.

Second, cell reselection is performed based on a cell reselection criterion. The cell reselection criterion has the following characteristics in relation to the measurements of a serving cell and neighboring cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_S = Q_{meas,s} + Q_{hyst}, R_n = Q_{meas,n} - Q_{offset} \quad [\text{Equation 1}]$$

In this case, Rs is the ranking criterion of a serving cell, Rn is the ranking criterion of a neighboring cell, Qmeas,s is the quality value of the serving cell measured by UE, Qmeas,n is the quality value of the neighboring cell measured by UE, Qhyst is the hysteresis value for ranking, and Qoffset is an offset between the two cells.

In Intra-frequency, if UE receives an offset "Qoffsets,n" between a serving cell and a neighboring cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighboring cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighboring cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
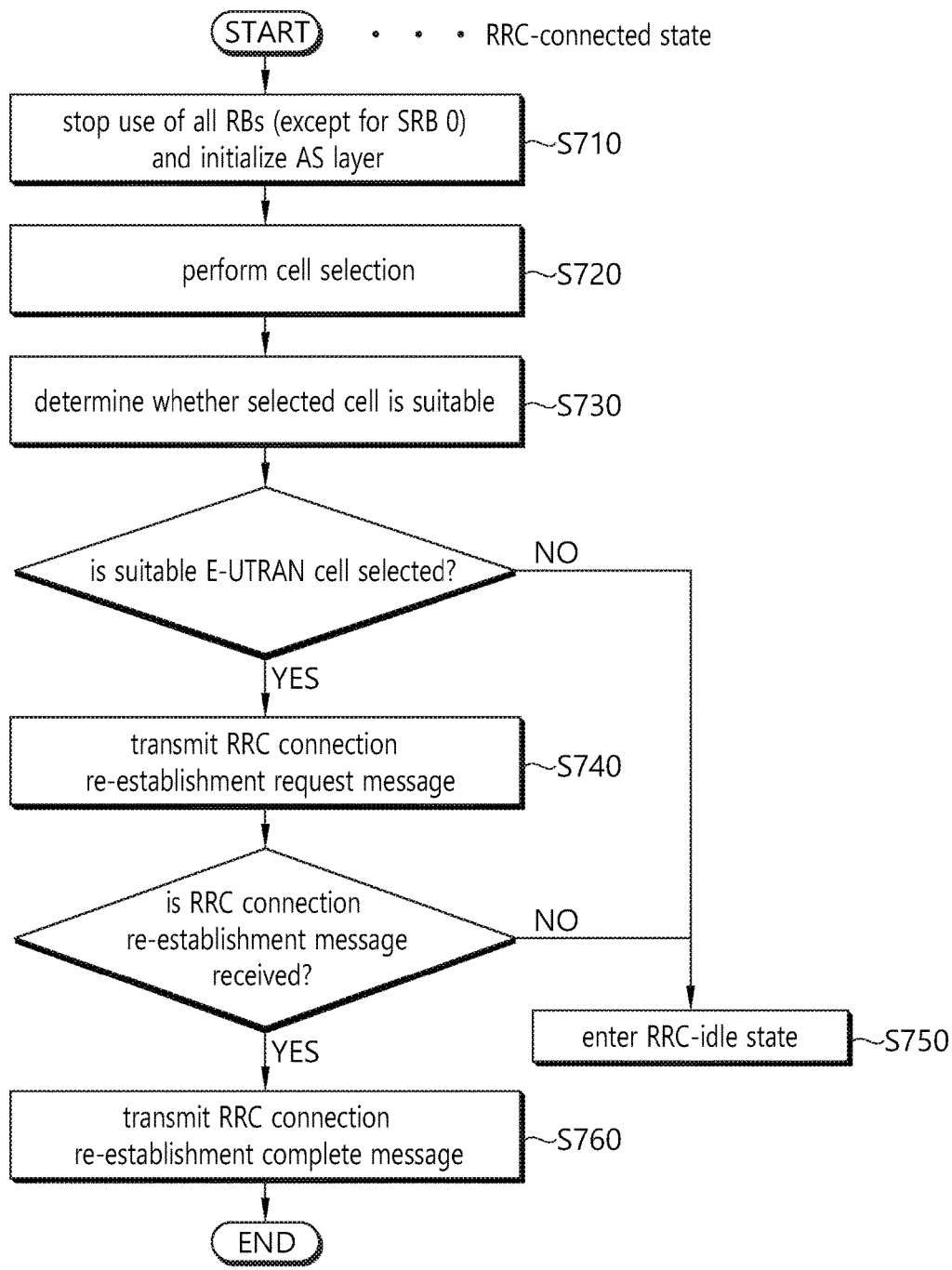
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
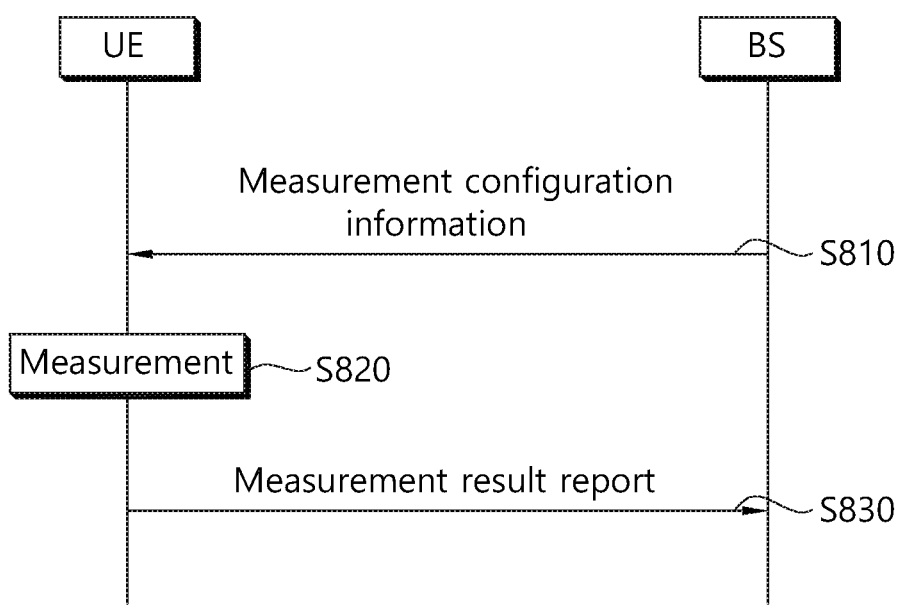
FIG. 8 shows a conventional method of performing measurement.

FIG. 8 shows a conventional method of performing measurement.

A UE receives measurement configuration information from a BS (S810). A message including the measurement configuration information is referred to as a measurement configuration message. The UE performs measurement based on the measurement configuration information (S820). If a measurement result satisfies a reporting condition included in the measurement configuration information, the UE reports the measurement result to the BS (S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
|---|---|
| Event A1 | Serving becomes better than threshold |
| Event A2 | Serving becomes worse than threshold |
| Event A3 | Neighbor becomes offset better than PCell/PSCell |
| Event A4 | Neighbor becomes better than threshold |
| Event A5 | PCell/PSCell becomes worse than threshold1 and neighbor becomes better than threshold2 |
| Event A6 | Neighbor becomes offset better than SCell |
| Event B1 | Inter RAT neighbor becomes better than threshold |
| Event B2 | PCell becomes worse than threshold1 and inter RAT neighbor becomes better than threshold2 |
| Event C1 | CSI-RS resource becomes better than threshold |
| Event C2 | CSI-RS resource becomes offset better than reference CSI-RS resource |

Figure 9:
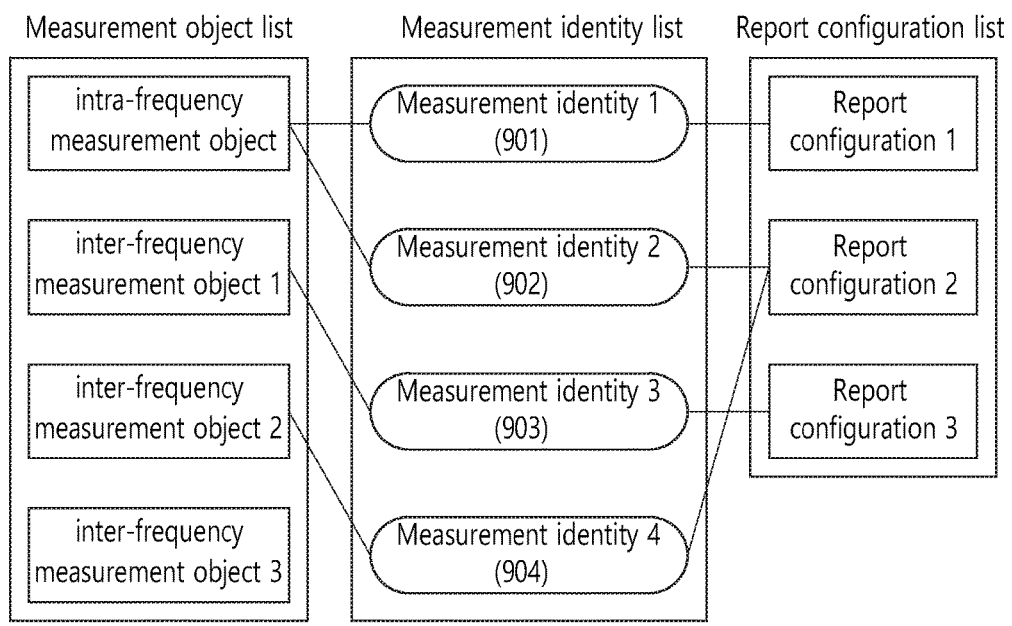
FIG. 9 shows an example of a measurement configuration assigned to a UE.

FIG. 9 shows an example of a measurement configuration assigned to a UE.

First, a measurement identity1 901 associates an intra-frequency measurement object with a reporting configuration 1. The UE performs intra-frequency measurement. The reporting configuration 1 is used to determine a reporting type and a criterion for reporting a measurement result.

A measurement identity2 902 is associated with the intra-frequency measurement object similarly to the measurement identifier1 901, and associates the intra-frequency measurement object with a reporting configuration 2. The UE performs intra-frequency measurement. The reporting configuration 2 is used to determine a reporting format and a criterion for reporting a measurement result.

By using the measurement identity1 901 and the measurement identity2 902, the UE transmits a measurement result even if the measurement result on the intra-frequency measurement object satisfies any one of the reporting configuration 1 and the reporting configuration 2.

A measurement identity3 903 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 904 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 10:
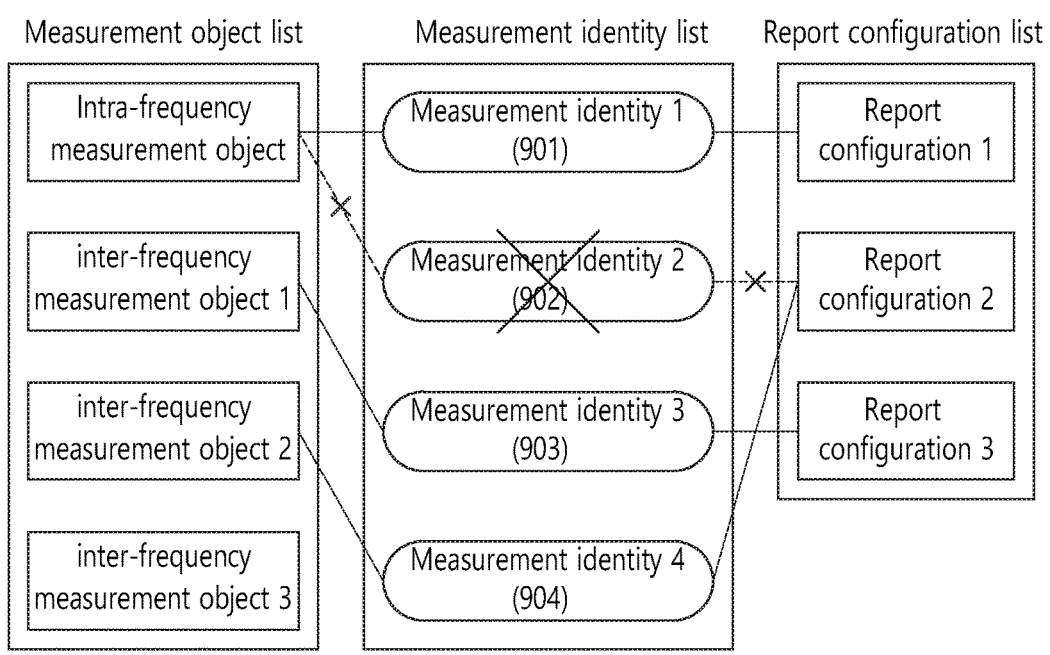
FIG. 10 shows an example of deleting a measurement identity.

FIG. 10 shows an example of deleting a measurement identity. When the measurement identity 2 902 is deleted, measurement for a measurement object associated with the measurement identity 2 902 is stopped and a measurement report is not transported. A measurement object or a reporting configuration associated with the deleted measurement identity may not be changed.

Figure 11:
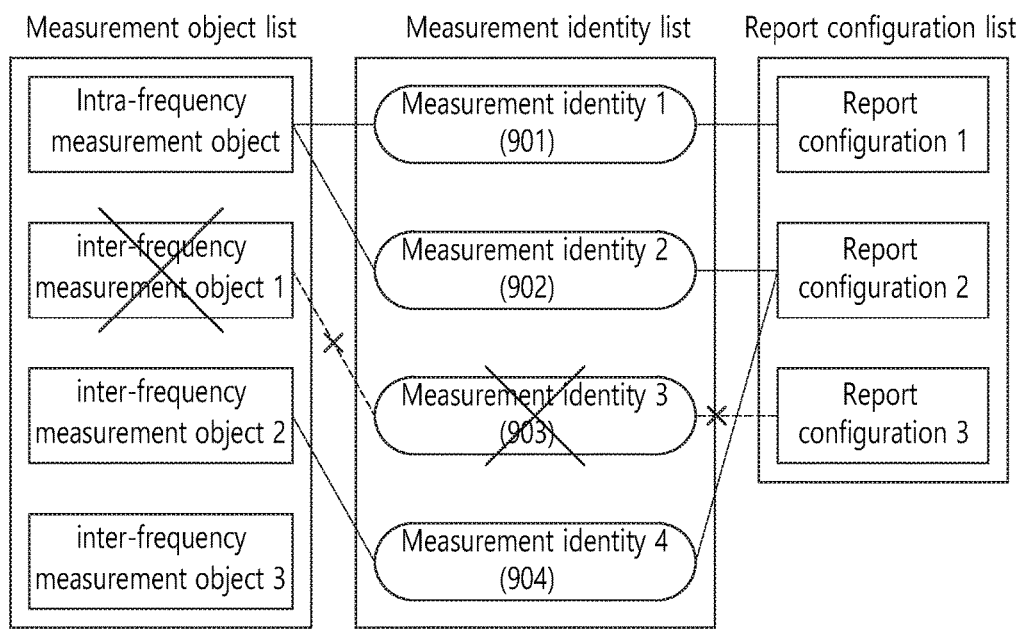
FIG. 11 shows an example of deleting the measurement object.

FIG. 11 shows an example of deleting the measurement object. When the inter-frequency measurement object 1 is deleted, the UE deletes even the measurement identity 3 903 associated therewith. Measurement for the inter-frequency measurement object 1 is stopped and a measurement report is not also transported. However, a reporting configuration associated with the deleted inter-frequency measurement object may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measurement quality of the neighboring cell. The measured quality may include at least one of reference signal received power (RSRP) and reference signal received quality (RSRQ).

Hereinafter, a reference signal (RS) is described.

In the wireless communication system, since data/signal is transmitted through a radio channel, the data/signal may be distorted on the radio during transmission. In order to normally receive the distorted signal, it is preferable that distortion of the received signal should be compensated using channel information. At this time, a reference signal (RS) known by both a transmitter and a receiver may be used by the transmitter and/or the receiver to detect channel information. The reference signal may be referred to as a pilot signal. When the transmitter transmits and receives data by using multiple antennas, it is preferable that a channel state between each transmitting antenna and each receiving antenna should be detected, whereby the receiver may receive the data exactly. At this time, it is preferable that each transmitting antenna of the transmitter has its individual reference signal to detect the channel state.

Downlink reference signals include a common reference signal (CRS) shared by all UEs in one cell, a UE-specific reference signal (UE-specific RS) only for a specific UE, a multimedia broadcast and multicast single frequency network (MBSFN) reference signal, a positioning reference signal (PRS), and a channel state information reference signal (CSI RS).

A transmitter may provide information for demodulation and channel measurement to a receiver using reference signals. The receiver (for example, a UE) may measure a channel state using a CRS and may feed an indicator relating to channel quality, such as a channel quality indicator (CQI), a precoding matrix index (PMI) and/or a rank indicator (RI), back to the transmitter (for example, a BS) according to the measured channel state. In the present specification, a CRS may be a cell-specific reference signal (cell-specific RS). The CRS is transmitted via all downlink subframes within a cell supporting PDSCH transmission. The CRS may be transmitted through antenna ports 0 to 3 and may be defined only for $\Delta f=15$ kHz. The CRS is disclosed in Section 6.10.1 of 3GPP TS 36.211 V10.1.0 (2011-03).

Meanwhile, a reference signal relating to the feedback of channel state information (CSI) may be defined as a CSI-RS. The CSI-RS may be relatively sparsely deployed in a frequency domain or time domain, and may be punctured in a data region of a normal subframe or an MBSFN subframe. If necessary, a CQI, a PMI, and an RI may be reported from a UE through CSI estimation.

A UE-specific RS may be transmitted to UEs through resource elements when the demodulation of data on a PDSCH is needed. A UE may receive the presence of a UE-specific RS through upper-layer signaling. The UE-specific RS is valid only when mapped to a corresponding PDSCH signal.

An MBSFN RS may be transmitted via a subframe allocated for MBSFN transmission. A PRS may be used for location estimation of a UE. A CSI RS is used for channel estimation for a PDSCH of a LTE-A UE.

Generally, an RS is transmitted as a sequence. Any sequence may be used as an RS sequence without particular restrictions. The RS sequence may be a phase shift keying (PSK)-based computer generated sequence. Examples of PSK include binary phase shift keying (BPS K), quadrature phase shift keying (QPSK), or the like. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, or the like. Alternatively, the RS sequence may be a pseudo-random (PN) sequence. Examples of the PN sequence include an m-sequence, a computer generated sequence, a Gold sequence, a Kasami sequence, or the like. In addition, the RS sequence may be a cyclically shifted sequence.

Hereinafter, event-triggering conditions for measurement reporting are described in detail.

Ten types of event-triggering conditions are defined for measurement reporting (see Table 1), and each event-triggering condition includes an entering condition and a leaving condition. A UE that satisfies an entering condition of an event from a BS may perform measurement reporting to the BS. When the UE performing measurement reporting satisfies a leaving condition of the event, the UE may stop measurement reporting to the BS. Hereinafter, an entering condition and a leaving condition of each event are illustrated.

1. Event A1 (Serving becomes better than threshold)
   (1) Event A1-1 entering condition: Ms−Hys>Thresh
   (2) Event A1-2 leaving condition: Ms+Hys<Thresh
2. Event A2 (Serving becomes worse than threshold)
   (1) Event A2-1 entering condition: Ms+Hys<Thresh
   (2) Event A2-2 leaving condition: Ms−Hys>Thresh A UE triggers an event based on a measurement result Ms of a serving cell. After applying each parameter, event A1 is triggered when the measurement result Ms of the serving cell is better than the threshold of event A1, while event A2 is triggered when the measurement result Ms of the serving cell is worse than the threshold of event A2.

3. Event A3 (Neighbor becomes offset better than PCell/PSCell)
   (1) Event A3-1 entering condition: Mn+Ofn+Ocn−Hys>Mp+Ofp+Ocp+Off
   (2) Event A3-2 leaving condition: Mn+Ofn+Ocn+Hys<Mp+Ofp+Ocp+Off
4. Event A4 (Neighbor becomes better than threshold)
   (1) Event A4-1 entering condition: Mn+Ofn+Ocn−Hys>Thresh
   (2) Event A4-2 leaving condition: Mn+Ofn+Ocn+Hys<Thresh UE triggers an event based on a measurement result Mp of a serving cell and a measurement result Mn of a neighboring cell. After applying each parameter, event A3 is triggered when the measurement result Mn of the neighboring cell is better than the offset of event A3, while event A4 is triggered when the measurement result Mn of the neighboring cell is better than the threshold of event A4.

5. Event A5 (PCell/PSCell becomes worse than threshold1 and neighbor becomes better than threshold2)
   (1) Event A5-1 entering condition: Mp+Hys<Thresh1
   (2) Event A5-2 entering condition: Mn+Ofn+Ocn−Hys>Thresh2
   (3) Event A5-3 leaving condition: Mp−Hys>Thresh)
   (4) Event A5-4 leaving condition: Mn+Ofn+Ocn+Hys<Thresh2

A UE triggers an event based on a measurement result Mp of a PCell/PSCell and a measurement result Mn of a neighboring cell. After applying each parameter, event A5 is triggered when the measurement result Mp of the PCell/PSCell is worse than threshold 1 of event A5 and the measurement result Mn of the neighboring cell is better than threshold 2 of event A5.

6. Event A6 (Neighbor becomes offset better than SCell)
   (1) Event A6-1 entering condition: Mn+Ocn−Hys>Ms+Ocs+Off
   (2) Event A6-2 leaving condition: Mn+Ocn+Hys<Ms+Ocs+Off A UE triggers an event based on a measurement result Ms of a serving cell and a measurement result Mn of a neighboring cell. After applying each parameter, event A6 is triggered when the measurement result Mn of the neighboring cell is better than the offset of event A6.

7. Event B1 (Inter RAT neighbor becomes better than threshold)
   (1) Event B1-1 entering condition: Mn+Ofn−Hys>Thresh
   (2) Event B1-2 leaving condition: Mn+Ofn+Hys<Thresh A UE triggers an event based on a measurement result Mn of a neighboring cell. After applying each parameter, event B1 is triggered when the measurement result Mn of the neighboring cell is better than the threshold of event B1.

8. Event B2 (PCell becomes worse than threshold) and inter RAT neighbor becomes better than threshold2)
   (1) Event B2-1 entering condition: Mp+Hys<Thresh)
   (2) Event B2-2 entering condition: Mn+Ofn−Hys>Thresh2
   (3) Event B2-3 leaving condition: Mp−Hys>Thresh)
   (4) Event B2-4 leaving condition: Mn+Ofn+Hys<Thresh2

A UE triggers an event based on a measurement result Mp of a PCell/PSCell and a measurement result Mn of a neighboring cell. After applying each parameter, event B2 is triggered when the measurement result Mp of the PCell/PSCell is worse than threshold 1 of event B2 and the measurement result Mn of the neighboring cell is better than threshold 2 of event B2.

9. Event C1 (CSI-RS resource becomes better than threshold)
   (1) Event C1-1 entering condition: Mcr+Ocr−Hys>Thresh
   (2) Event C1-2 leaving condition: Mcr+Ocr+Hys<Thresh A UE triggers an event based on a CSI-RS measurement result Mcr. After applying each parameter, event C1 is triggered when the CSI-RS measurement result Mcr is better than the threshold of event C1.

10. Event C2 (CSI-RS resource becomes offset better than reference CSI-RS resource)
   (1) Event C2-1 entering condition: Mcr+Ocr−Hys>Mref+Oref+Off
   (2) Event C2-2 leaving condition: Mcr+Ocr+Hys<Mref+Oref+Off A UE triggers an event based on a CSI-RS measurement result Mcr and a measurement result Mref of a reference CSI-RS resource. After applying each parameter, event C2 is triggered when the measurement result Mref of the reference CSI-RS resource is better than the offset of event C2.

Parameters defined for each event are as follows.

Ms is a measurement result of a serving cell, which does not consider any offset.

Mp is a measurement result of a PCell/PSCell, which does not consider any offset.

Mn is a measurement result of a neighboring cell, which does not consider any offset.

Mcr is a measurement result of a CSI-RS resource, which does not consider any offset.

Hys is a hysteresis parameter for each event (that is, a hysteresis defined in a reporting configuration EUTRA (reportConfigEUTRA) for each event).

Ofn is a frequency-specific offset for a frequency of a neighboring cell (that is, an offset frequency defined in a measurement object EUTRA (measObjectEUTRA) corresponding to a frequency of a neighboring cell).

Ocs is a cell-specific offset for a serving cell (that is, a cell individual offset (cellIndividualOffset) defined in a measurement object EUTRA corresponding to a frequency of a serving cell). If no Ocs is set for a serving cell, the offset is set to 0.

Ocn is a cell-specific offset for a neighboring cell (that is, a cell individual offset defined in a measurement object EUTRA corresponding to a frequency of a neighboring cell). If no Ocn is set for a neighboring cell, the offset is set to 0.

Ofp is a frequency-specific offset for a frequency of a PCell/PSCell (that is, an offset frequency defined in a measurement object EUTRA corresponding to a frequency of a PCell/PSCell).

Ocp is a cell-specific offset for a PCell/PSCell (that is, a cell individual offset defined in a measurement object EUTRA corresponding to a frequency of a PCell/PSCell). If no Ocp is set for a PCell/PSCell, the offset is set to 0.

Ocr is a CSI-RS-specific offset (that is, a CSI-RS individual offset (csi-RS-IndividualOffset) defined in a measurement object EUTRA corresponding to a frequency of a CSI-RS resource). If no Ocr is set for a CSI-RS resource, the offset is set to 0.

Mref is a measurement result of a reference CSI-RS resource (that is, a measurement result of a reference CSI-RS resource defined in a reporting configuration EUTRA for event C2), which does not consider any offset.

Oref is a CSI-RS-specific offset for a reference CSI-RS resource (that is, a CSI-RS individual offset defined in a measurement object EUTRA corresponding to a frequency of a reference CSI-RS resource). If no Oref is set for a CSI-RS resource, the offset is set to 0.

Thresh is a threshold parameter for each event (that is, a threshold defined in a reporting configuration EUTRA for each event). Different threshold parameters may be used respectively for events A1 to C2.

Off is an offset parameter for each event (that is, an offset defined in a reporting configuration EUTRA for each event). Different offset parameters may be used respectively for events A3, A6, and C2.

A BS may report or may not report a serving-cell quality threshold (s-Measure). When the BS reports the quality threshold of a serving cell, a UE performs the measurement of a neighboring cell and the evaluation of an event (determining whether an event-triggering condition is satisfied, also referred to as the evaluation of reporting criteria) when the quality (RSRP) of the serving cell is lower than the quality threshold of the serving cell. When the BS does not report the quality threshold of the serving cell, the UE performs the measurement of the neighboring cell and the evaluation of an event without depending on the quality (RSRP) of serving cell.

Hereinafter, reference signal signal-to-interference-and-noise ratio (RS-SINR) is described.

Measuring RS-SINR is important for service providers. The reason why service providers prefer RS-SINR to RSRQ is mainly because RS-SINR is closely associated with throughput. A network may evaluate throughput based on RS-SINR for optimization. RS-SINR is measured based on a CRS. RS-SINR may be defined by Equation 2.

$$RS-SINR = \frac{E_{CRS}}{I_{CRS} + N_{CRS}} \quad \text{[Equation 2]}$$

$E_{CRS}$ denotes the average power for CRSs in the entire system bandwidth for a serving cell, $I_{CRS}$ denotes cell interference, and $N_{CRS}$ denotes thermal noise.

For maximal user throughput, a UE may support RS-SINR measurement for multicarrier load distribution. The RS-SINR measurement may be either wideband measurement or narrowband measurement. Narrowband RS-SINR measurement may be RS-SINR measurement that is performed in six resource blocks (six RBs). Wideband RS-SINR measurement may be RS-SINR measurement that is performed in a wider band than six RBs. Alternatively, wideband RS-SINR measurement may be RS-SINR measurement that is performed over the entire frequency band. Wideband SINR measurement may have improved measurement accuracy as compared with narrowband RS-SINR measurement.

When the UE supports RS-SINR measurement, RS-SINR measurement may need to be considered in a measurement report-triggering condition in order to measure quantity.

Currently, however, the measurement report-triggering condition supports only RSRP/RSRQ measurement and does not support RS-SINR measurement.

Hereinafter, a measurement report-triggering condition for RS-SINR measurement, a method for applying an offset to the measurement report-triggering condition, and a device supporting the same according to one embodiment of the present invention will be described.

RS-SINR measurement may provide different levels of measurement accuracy depending on narrowband RS-SINR measurement or wideband RS-SINR measurement. Therefore, different measurement report-triggering conditions for RS-SINR measurement may need to be determined depending on the RS-SINR measurement type of a neighboring cell. Alternatively, different measurement report-triggering conditions for RS-SINR measurement may need to be determined depending on the RS-SINR measurement type of a neighboring cell and the RS-SINR measurement type of a serving cell.

When measurement reporting is triggered by an event, the UE may determine whether it is necessary to apply an offset to a measurement report-triggering condition depending on whether the assessed RS-SINR of a cell is measured in a wideband or in a narrowband. The event may be an event for determining whether the neighboring cell to which the offset has been applied is better than the serving cell. The UE may be a UE supporting RS-SINR measurement.

Specifically, events for comparing the quality measured in the serving cell with the quality measured in the neighboring cell may include the following types. First, the UE may perform wideband RS-SINR measurement on the serving cell and may perform narrowband RS-SINR measurement on the neighboring cell (case 1). Second, the UE may perform narrowband RS-SINR measurements on the serving cell and may perform wideband RS-SINR measurements on the neighboring cell (case 2). Third, the UE may perform wideband RS-SINR measurement on the serving cell and may perform wideband RS-SINR measurement on the neighboring cell (case 3a). Fourth, the UE may perform narrowband RS-SINR measurement on the serving cell and may perform narrowband RS-SINR measurement on the neighboring cell (case 3b).

Hereinafter, a method for applying an offset to each case according to one embodiment of the present invention will be described.

(1) Applying an offset to case 1

A UE may perform wideband RS-SINR measurement on a serving cell and may perform narrowband RS-SINR measurement on a neighboring cell. That is, the measurement type of the serving cell may be different from the measurement type of the neighboring cell. In this case, the result of wideband RS-SINR measurement on the serving cell may be compared with the result of narrowband RS-SINR measurement on the neighboring cell. Since the measurement type of the serving cell is different from the measurement type of the neighboring cell, it may be necessary to apply an offset to a measurement report-triggering condition.

For example, when the measurement report-triggering condition is to determine whether the quality of the neighboring cell is better than the quality of the serving cell, the measurement report-triggering condition to which the offset has been applied may be determining whether a value obtained by applying a narrowband RS-SINR offset to the quality of the neighboring cell is better than the quality of the serving cell.

For example, when the measurement report-triggering condition is to determine whether the quality of the neighboring cell is better than the quality of the serving cell, the measurement report-triggering condition to which the offset has been applied may be determining whether a value obtained by applying a wideband RS-SINR offset to the quality of the serving cell is worse than the quality of the neighboring cell.

For example, the measurement report-triggering condition to which the offset has been applied may be defined as Equation 3.

$$S_w < N_n + \text{offset}_{N\_n} \quad \text{[Equation 3]}$$

$S_w$ denotes the result of wideband RS-SINR measurement on the serving cell, $N_n$ denotes the result of narrowband RS-SINR measurement on the neighboring cell, and $\text{offset}_{N\_n}$ denotes the narrowband RS-SINR measurement offset of the neighboring cell.

Referring to Equation 3, the UE may apply an offset to the result of narrowband RS-SINR measurement on the neighboring cell based on the result of wideband RS-SINR measurement on the serving cell. The offset may be the narrowband RS-SINR measurement offset of the neighboring cell.

For example, the measurement report-triggering condition to which the offset has been applied may be defined as Equation 4.

$$S_w + \text{offset}_{S\_w} < N_n \quad \text{[Equation 4]}$$

$S_w$ denotes the result of wideband RS-SINR measurement on the serving cell, $N_n$ denotes the result of narrowband RS-SINR measurement on the neighboring cell, and $\text{offset}_{S\_w}$ denotes the wideband RS-SINR measurement offset of the serving cell.

Referring to Equation 4, the UE may apply an offset to the result of wideband RS-SINR measurement on the serving cell based on the result of narrowband RS-SINR measurement on the neighboring cell. The offset may be the wideband RS-SINR measurement offset of the serving cell.

(2) Applying an offset to Case 2

A UE may perform narrowband RS-SINR measurement on a serving cell and may perform wideband RS-SINR measurement on a neighboring cell. That is, the measurement type of the serving cell may be different from the measurement type of the neighboring cell. In this case, the result of narrowband RS-SINR measurement on the serving cell may be compared with the result of wideband RS-SINR measurement on the neighboring cell. Since the measurement type of the serving cell is different from the measurement type of the neighboring cell, it may be necessary to apply an offset to a measurement report-triggering condition.

For example, when the measurement report-triggering condition is to determine whether the quality of the neighboring cell is better than the quality of the serving cell, the measurement report-triggering condition to which the offset has been applied may be determining whether a value obtained by applying a wideband RS-SINR offset to the quality of the neighboring cell is better than the quality of the serving cell.

For example, when the measurement report-triggering condition is to determine whether the quality of the neighboring cell is better than the quality of the serving cell, the measurement report-triggering condition to which the offset has been applied may be determining whether a value obtained by applying a narrowband RS-SINR offset to the quality of the serving cell is worse than the quality of the neighboring cell.

For example, the measurement report-triggering condition to which the offset has been applied may be defined as Equation 5.

$$S_n < N_w + \text{offset}_{N\_w} \quad \text{[Equation 5]}$$

$S_n$ denotes the result of narrowband RS-SINR measurement on the serving cell, $N_w$ denotes the result of wideband RS-SINR measurement on the neighboring cell, and $\text{offset}_{N\_w}$ denotes the wideband RS-SINR measurement offset of the neighboring cell.

Referring to Equation 5, the UE may apply an offset to the result of wideband RS-SINR measurement on the neighboring cell based on the result of narrowband RS-SINR measurement on the serving cell. The offset may be the wideband RS-SINR measurement offset of the neighboring cell.

For example, the measurement report-triggering condition to which the offset has been applied may be defined as Equation 6.

$$S_n + \text{offset}_{W\_n} < N_w \quad \text{[Equation 6]}$$

$S_n$ denotes the result of narrowband RS-SINR measurement on the serving cell, $N_w$ denotes the result of wideband RS-SINR measurement on the neighboring cell, and $\text{offset}_{S\_n}$ denotes the narrowband RS-SINR measurement offset of the serving cell.

Referring to Equation 6, the UE the UE may apply an offset to the result of narrowband RS-SINR measurement on the serving cell based on the result of wideband RS-SINR measurement on the neighboring cell. The offset may be the narrowband RS-SINR measurement offset of the serving cell.

(3) Applying No Offset to Cases 3a and 3b

In case 3a, a UE may perform wideband RS-SINR measurement on a serving cell and may perform wideband RS-SINR measurement on a neighboring cell. That is, the measurement type of the serving cell may be the same as the measurement type of the neighboring cell. In this case, the result of wideband RS-SINR measurement on the serving cell may be compared with the result of wideband RS-SINR measurement on the neighboring cell. Since the measurement type of the serving cell is the same as the measurement type of the neighboring cell, an offset may not be applied to a measurement report-triggering condition.

In case 3a, a UE may perform narrowband RS-SINR measurement on a serving cell and may perform narrowband RS-SINR measurement on a neighboring cell. That is, the measurement type of the serving cell may be the same as the measurement type of the neighboring cell. In this case, the result of narrowband RS-SINR measurement on the serving cell may be compared with the result of narrowband RS-SINR measurement on the neighboring cell. Since the measurement type of the serving cell is the same as the measurement type of the neighboring cell, an offset may not be applied to a measurement report-triggering condition.

Figure 12:
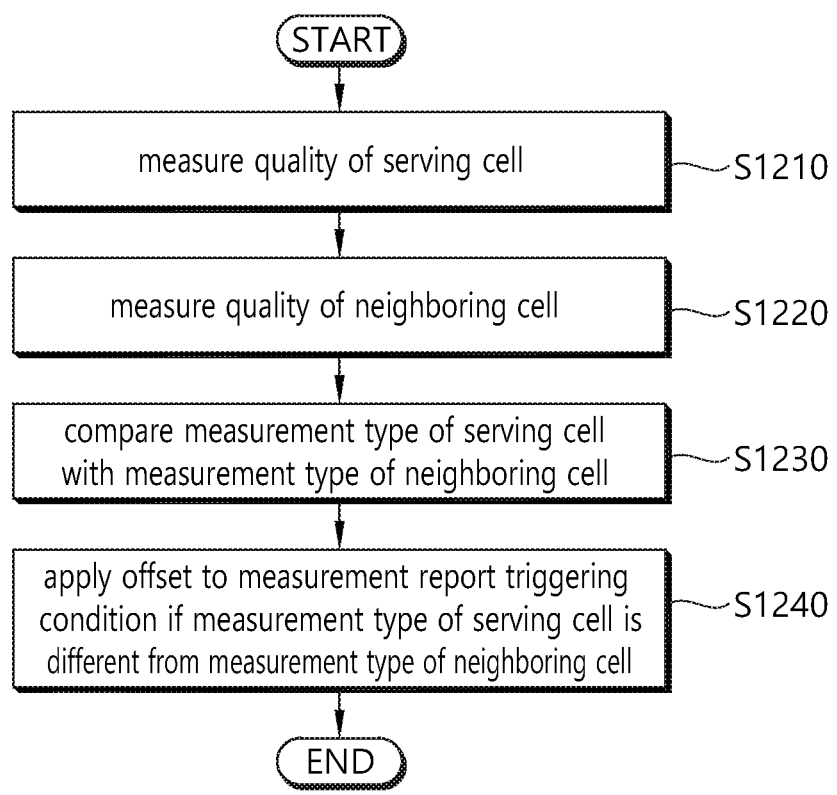
FIG. 12 is a block diagram illustrating a method for applying, by a UE, an offset to a measurement report-triggering condition according to one embodiment of the present invention.

FIG. 12 is a block diagram illustrating a method for applying, by a UE, an offset to a measurement report-triggering condition according to one embodiment of the present invention Referring to FIG. 12, the UE may measure the quality of a serving cell (S1210). The UE may measure the quality of a neighboring cell (S1220).

The UE may compare the measurement type of the serving cell with the measurement type of the neighboring cell (S1230). The measurement type may be either wideband RS-SINR measurement or narrowband RS-SINR measurement.

When the measurement type of the serving cell is different from the measurement type of the neighboring cell, the UE may apply an offset to a measurement report-triggering condition (S1240). When the measurement type of the serving cell is the same as the measurement type of the neighboring cell, the UE may not apply the offset to the measurement report-triggering condition. The measurement report-triggering condition may be a condition that the quality of the neighboring cell is better than the quality of the serving cell.

The measurement type of the serving cell may be the wideband RS-SINR measurement, and the measurement type of the neighboring cell may be the narrowband RS-SINR measurement. The offset may be a narrowband RS-SINR offset of the neighboring cell. The measurement report-triggering condition to which the offset has been applied may be a condition that a value obtained by applying the narrowband RS-SINR offset to the quality of the neighboring cell is better than the quality of the serving cell. When the measurement report-triggering condition to which the offset has been applied is satisfied, the UE may perform measurement reporting.

The measurement type of the serving cell may be the narrowband RS-SINR measurement, and the measurement type of the neighboring cell may be the wideband RS-SINR measurement. The offset may be a wideband RS-SINR offset of the neighboring cell. The measurement report-triggering condition to which the offset has been applied may be a condition that a value obtained by applying the wideband RS-SINR offset to the quality of the neighboring cell is better than the quality of the serving cell. When the measurement report-triggering condition to which the offset has been applied is satisfied, the UE may perform measurement reporting.

Figure 13:
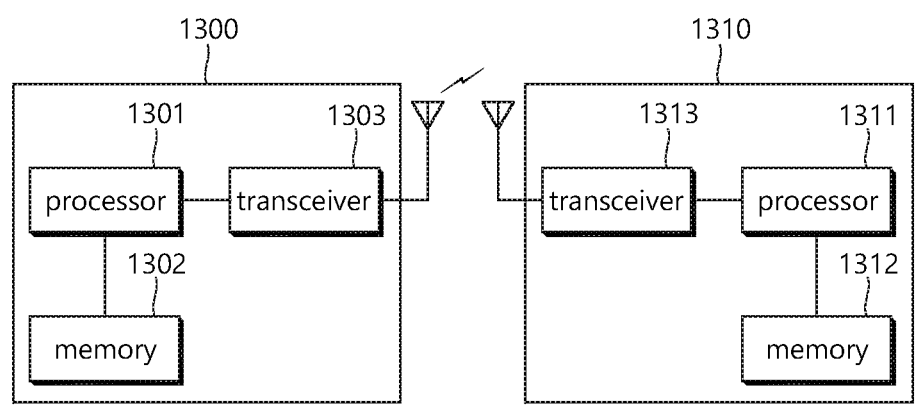
FIG. 13 is a block diagram illustrating a wireless communication system according to the embodiment of the present invention.

FIG. 13 is a block diagram illustrating a wireless communication system according to the embodiment of the present invention.

A BS 1300 includes a processor 1301, a memory 1302 and a transceiver 1303. The memory 1302 is connected to the processor 1301, and stores various information for driving the processor 1301. The transceiver 1303 is connected to the processor 1801, and transmits and/or receives radio signals. The processor 1301 implements proposed functions, processes and/or methods. In the above embodiment, an operation of the base station may be implemented by the processor 1301.

A UE 1310 includes a processor 1311, a memory 1312 and a transceiver 1313. The memory 1312 is connected to the processor 1311, and stores various information for driving the processor 1311. The transceiver 1313 is connected to the processor 1311, and transmits and/or receives radio signals. The processor 1311 implements proposed functions, processes and/or methods. In the above embodiment, an operation of the UE may be implemented by the processor 1311.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for applying, by a user equipment (UE), an offset to a measurement report-triggering condition in a wireless communication system, the method comprising:
   measuring a quality of a serving cell;
   measuring a quality of a neighboring cell;
   comparing a measurement type of the serving cell with a measurement type of the neighboring cell; and
   applying an offset to a measurement report-triggering condition when the measurement type of the serving cell is different from the measurement type of the neighboring cell,
   wherein the measurement type is either wideband reference signal signal-to-interference-and-noise ratio (RS-SINR) measurement or narrowband RS-SINR measurement.

2. The method of claim 1, wherein the measurement report-triggering condition is a condition that the quality of the neighboring cell is better than the quality of the serving cell.

3. The method of claim 1, wherein the measurement type of the serving cell is the wideband RS-SINR measurement, and the measurement type of the neighboring cell is the narrowband RS-SINR measurement.

4. The method of claim 3, wherein the offset is a narrowband RS-SINR offset of the neighboring cell.

5. The method of claim 4, wherein the measurement report-triggering condition to which the offset has been applied is a condition that a value obtained by applying the narrowband RS-SINR offset to the quality of the neighboring cell is better than the quality of the serving cell.

6. The method of claim 5, further comprising performing, by the UE, measurement reporting when the measurement report-triggering condition to which the offset has been applied is satisfied.

7. The method of claim 1, wherein the measurement type of the serving cell is the narrowband RS-SINR measurement, and the measurement type of the neighboring cell is the wideband RS-SINR measurement.

8. The method of claim 7, wherein the offset is a wideband RS-SINR offset of the neighboring cell.

9. The method of claim 8, wherein the measurement report-triggering condition to which the offset has been applied is a condition that a value obtained by applying the wideband RS-SINR offset to the quality of the neighboring cell is better than the quality of the serving cell.

10. The method of claim 9, further comprising performing, by the UE, measurement reporting when the measurement report-triggering condition to which the offset has been applied is satisfied.

11. The method of claim 1, further comprising not applying, by the UE, the offset to the measurement report-triggering condition when the measurement type of the serving cell is the same as the measurement type of the neighboring cell.

12. A user equipment (UE) applying an offset to a measurement report-triggering condition in a wireless communication system, the UE comprising:
   a memory;
   a transceiver; and
   a processor to connect the memory and the transceiver,
   wherein the processor is configured to: measure a quality of a serving cell; measure a quality of a neighboring cell; compare a measurement type of the serving cell with a measurement type of the neighboring cell; and apply an offset to a measurement report-triggering condition when the measurement type of the serving cell is different from the measurement type of the neighboring cell, and
   the measurement type is either wideband reference signal signal-to-interference-and-noise ratio (RS-SINR) measurement or narrowband RS-SINR measurement.

13. The UE of claim 12, wherein the measurement type of the serving cell is the wideband RS-SINR measurement, and the measurement type of the neighboring cell is the narrowband RS-SINR measurement.

14. The UE of claim 13, wherein the offset is a narrowband RS-SINR offset of the neighboring cell.

15. The UE of claim 14, wherein the measurement report-triggering condition to which the offset has been applied is a condition that a value obtained by applying the narrowband RS-SINR offset to the quality of the neighboring cell is better than the quality of the serving cell.

* * * * *